(12) United States Patent
Zachara et al.

(10) Patent No.: US 11,581,625 B2
(45) Date of Patent: Feb. 14, 2023

(54) SECONDARY ANTENNA FOR WIRELESS MICROPHONE

(71) Applicant: Shure Acquisition Holdings, Inc., Niles, IL (US)

(72) Inventors: Christopher Zachara, Lake Bluff, IL (US); Gregory W. Bachman, Glen Ellyn, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 965 days.

(21) Appl. No.: 16/298,702

(22) Filed: Mar. 11, 2019

(65) Prior Publication Data
US 2020/0076053 A1  Mar. 5, 2020

Related U.S. Application Data

(63) Continuation of application No. 15/187,063, filed on Jun. 20, 2016, now Pat. No. 10,230,153.

(51) Int. Cl.
*H01Q 1/00* (2006.01)
*H01Q 1/22* (2006.01)
*H04R 1/00* (2006.01)
*H04R 1/04* (2006.01)
*H01Q 5/50* (2015.01)
(Continued)

(52) U.S. Cl.
CPC ............. *H01Q 1/2291* (2013.01); *H01Q 1/36* (2013.01); *H01Q 1/50* (2013.01); *H01Q 5/50* (2015.01); *H04B 1/3833* (2013.01); *H04R 1/00* (2013.01); *H04R 1/04* (2013.01); *H04R 2420/07* (2013.01)

(58) Field of Classification Search
None
See application file for complete search history.

(56) References Cited

U.S. PATENT DOCUMENTS 4,344,184 A   8/1982  Edwards
4,725,845 A   2/1988  Phillips
(Continued)

FOREIGN PATENT DOCUMENTS

CN   202035120   11/2011
CN   202736480    2/2013
(Continued)

OTHER PUBLICATIONS

International Search Report and Written Opinion for PCT/US2017/037644 dated Sep. 18, 2017, 13 pp.

*Primary Examiner* — Graham P Smith
(74) *Attorney, Agent, or Firm* — Neal, Gerber & Eisenberg LLP (57) ABSTRACT

Embodiments include a wireless microphone comprising an elongated main body configured for handheld operation of the microphone; a display bezel area included in the main body; a first antenna positioned at a bottom end of the main body; and a second antenna integrated into the display bezel area. Embodiments also include a wireless handheld microphone comprising a main body having a conductive housing and a tubular shape configured for handheld operation of the microphone; an opening included on a side surface of the conductive housing; a non-conductive cover coupled to the conductive housing and configured to cover the opening; and an antenna positioned adjacent to the non-conductive cover.

27 Claims, 4 Drawing Sheets

(51) Int. Cl.
    *H01Q 1/36*     (2006.01)
    *H01Q 1/50*     (2006.01)
    *H04B 1/3827*     (2015.01)

(56) References Cited

U.S. PATENT DOCUMENTS

| | | | |
|---|---|---|---|
| 6,140,973 | A | 10/2000 | Annamaa |
| 7,301,506 | B2 | 11/2007 | Kenkel |
| 8,576,131 | B2 | 11/2013 | Szopko |
| 8,896,488 | B2 | 11/2014 | Ayala Vazquez |
| 9,186,828 | B2 | 11/2015 | Guterman |
| 9,711,858 | B1 * | 7/2017 | Lee .................... H01Q 9/06 |
| 10,079,428 | B2 * | 9/2018 | Nissinen ................. H01Q 7/00 |
| 10,230,153 | B2 * | 3/2019 | Zachara .............. H04B 1/3833 |
| 10,230,159 | B2 | 3/2019 | Zachara |
| 10,916,846 | B2 * | 2/2021 | Desclos ................. H01Q 9/06 |
| 2004/0227683 | A1 | 11/2004 | Caimi |
| 2006/0017649 | A1 | 1/2006 | Ooi |
| 2007/0168819 | A1 | 7/2007 | Buhe |
| 2009/0040115 | A1 * | 2/2009 | Zhang ..................... H01Q 1/36 343/702 |
| 2009/0202087 | A1 | 8/2009 | Nakashima |
| 2010/0054515 | A1 | 3/2010 | Donauer |
| 2011/0032170 | A1 * | 2/2011 | Chiang ................ H01Q 1/2266 343/860 |
| 2011/0211714 | A1 | 9/2011 | Plath |
| 2013/0307735 | A1 | 11/2013 | Contreras |
| 2015/0188226 | A1 | 7/2015 | Ng |
| 2016/0126630 | A1 | 5/2016 | Martiskainen |

FOREIGN PATENT DOCUMENTS

| | | |
|---|---|---|
| EP | 2495806 | 9/2012 |
| KR | 20100127596 | 12/2010 |
| WO | 2006084103 | 8/2006 |

* cited by examiner

SECONDARY ANTENNA FOR WIRELESS MICROPHONE

CROSS-REFERENCE

This application is a continuation of U.S. patent application Ser. No. 15/187,063, filed Jun. 20, 2016 and entitled "Secondary Antenna for Wireless Microphone," the contents of which are incorporated by reference herein in their entirety.

TECHNICAL FIELD

This application generally relates to antennas included in wireless handheld microphones, and more specifically, to secondary antennas included in wireless handheld microphones.

BACKGROUND

Wireless microphones are used to transmit sound to an amplifier or recording device without the need for a physical cable. They are used for many functions, including, for example, enabling broadcasters and other video programming networks to perform electronic news gathering (ENG) activities at locations in the field and the broadcasting of live sports events. Wireless microphones are also used in theaters and music venues, film studios, conventions, corporate events, houses of worship, major sports leagues, and schools.

Typically, wireless microphone systems include a microphone that is, for example, a handheld unit, a body-worn device, or an in-ear monitor; a transmitter (e.g., either built into the handheld microphone or in a separate "body pack" device) comprising one or more antennas for transmitting audio signals captured by the microphone; and a remote receiver comprising one or more antennas for receiving the audio signals from the transmitter. The antennas included in the microphone, transmitter, and receiver can be designed to operate in certain spectrum band(s), and may be designed to cover either a discrete set of frequencies within the spectrum band or an entire range of frequencies in the band. The spectrum band in which the microphone system operates can determine which technical rules and/or government regulations apply to that microphone system. For example, the Federal Communications Commission (FCC) allows the use of wireless microphones on a licensed and unlicensed basis, depending on the spectrum band.

Most wireless microphone systems that operate today use spectrum within the "Ultra High Frequency" (UHF) bands that are currently designated for television (TV) (e.g., TV channels 2 to 51, except channel 37). Currently, wireless microphone users need a license from the FCC in order to operate in the UHF/TV bands (e.g., 470-698 MHz). However, the amount of spectrum in the TV bands available for wireless microphones is set to decrease once the FCC conducts the Broadcast Television Incentive Auction. This Auction will repurpose a portion of the TV band spectrum—the 600 MHz—for new wireless services, making this band no longer available for wireless microphone use. Wireless microphone systems can also be designed for operation in the currently licensed "Very High Frequency" (VHF) bands, which cover the 30-300 MHz range.

An increasing number of wireless microphone systems are being developed for operation in other spectrum bands on an unlicensed basis, including, for example, the 902-928 MHz band, the 1920-1930 MHz band (i.e. the 1.9 GHz or "DECT" band; also included within the 1.8 GHz band) and the 2.4-2.483 GHz band (i.e. "ZigBee" or IEEE 802.15.4; referred to herein as the "2.4 GHz band"). However, given the vast difference in frequency between, for example, the UHF/TV bands and the ZigBee band, wireless microphone systems that are specifically designed for one of these two spectrums typically cannot be repurposed for the other spectrum without replacing the existing antenna(s).

Moreover, antenna design considerations can limit the number of antennas that are included within a single device (e.g., due to a lack of available space), while aesthetic design considerations can restrict the type of antennas that can be used. For example, whip antennas are traditionally good performers and by virtue of its external design, take up very little internal device space. However, these antennas can be expensive, distracting (for example, during a performance), and aesthetically unappealing, especially when they are long in length. As another example, handheld microphones typically include a reduced-size antenna that is integrated into the microphone housing to keep the overall package size small and comfortable to use. However, this limitation in antenna size/space makes it difficult for the handheld microphone to provide sufficient radiated efficiency. Moreover, handheld microphones with metal housings typically have very limited locations available for placement of an antenna, such as, for example, the very bottom of the microphone body. As a result, adding an additional antenna to such microphones can be difficult, if not impossible.

Accordingly, there is a need for a wireless microphone that can adapt to changes in spectrum availability, but still provide consistent, high quality, broadband performance with a low-cost, aesthetically-pleasing design.

SUMMARY

The invention is intended to solve the above-noted problems by providing, among other things, (1) a wireless handheld microphone comprising a secondary antenna configured to operate in high frequency bands (e.g., 1.5 GHz, 1.8 GHz, 2.4 GHz, 5.7 GHz, 6.9 GHz, or 7.1 GHz), and (2) placement of an antenna within the conductive body of a wireless handheld microphone.

Example embodiments include a wireless microphone comprising an elongated main body configured for handheld operation of the microphone; a display bezel area included in the main body; a first antenna positioned at a bottom end of the main body; and a second antenna integrated into the display bezel area.

Embodiments also include a wireless handheld microphone comprising a main body having a conductive housing and a tubular shape configured for handheld operation of the microphone; an opening included on a side surface of the conductive housing; a non-conductive cover coupled to the conductive housing and configured to cover the opening; and an antenna positioned adjacent to the non-conductive cover.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

The description that follows describes, illustrates and exemplifies one or more particular embodiments of the invention in accordance with its principles. This description is not provided to limit the invention to the embodiments described herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

Figure 1:
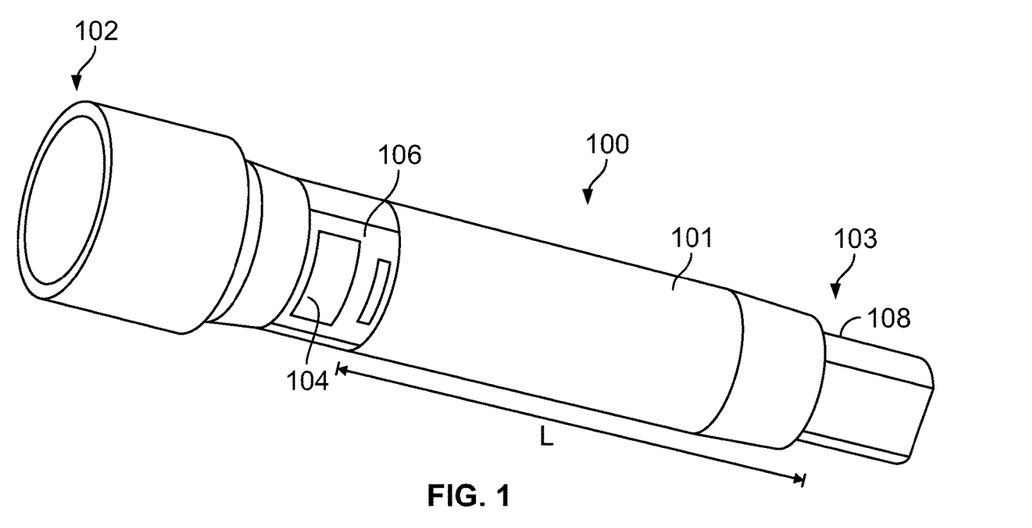
FIG. 1 is a side perspective view of an example wireless handheld microphone, in accordance with certain embodiments.

FIG. 1 illustrates an example wireless handheld microphone 100, in accordance with embodiments. The wireless microphone 100 comprises a main body 101 extending between a top end 102 and an opposing bottom end 103 of the main body 101. As shown, the main body 101 forms an elongated, tubular handle for facilitating handheld usage of the microphone 100. In embodiments, the wireless microphone 100 also comprises a display screen 104 (such as, for example, a liquid crystal display (LCD) or other suitable display) included in a display bezel area 106 of the main body 101. As will be appreciated, the wireless microphone 100 may also include a microphone head (not shown) coupled to the top end 102 of the main body 101. The microphone head typically includes a transducer element for receiving sound input, such as, for example, a dynamic, condenser, ribbon, or any other type of transducer element. The microphone head may also include, for example, a microphone grille, a microphone cover, and/or other components for covering the transducer.

Figure 2:
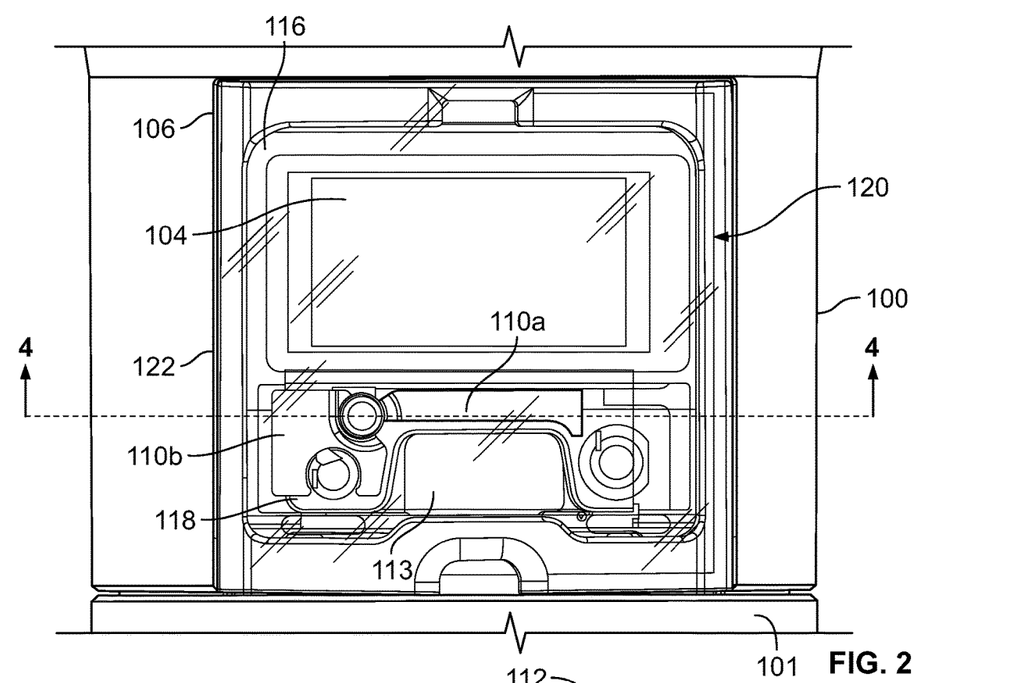
FIG. 2 is a close-up front view of an example display bezel area of the wireless handheld microphone of FIG. 1, in accordance with certain embodiments.

Referring additionally to FIG. 2, the wireless microphone 100 further includes a primary antenna assembly 108 coupled to the bottom end 103 of the main body 101, as shown in FIG. 1, and a secondary antenna 110 embedded into the display bezel area 106, as shown in FIG. 2, in accordance with embodiments. As shown in FIG. 1, the main body 101 spans a distance L between the secondary antenna 110 and the primary antenna assembly 108, and extends around and beyond the display bezel area 106 towards the top end 102. In embodiments, the secondary antenna 110 can be formed from metal or other conductive material using any suitable technique, including, for example, laser direct structuring (LDS), metal forming, foiling, or selective plating. In some embodiments, the antenna structure 110 is printed onto an underlying plastic support piece (see, e.g., antenna support 118 in FIG. 3) using the LDS technique.

In embodiments, the main body 101 can be made primarily of metal or other conductive material and can be configured to form an enclosure for housing various components of the microphone 100. In addition, the main body 101 can include an opening or gap within a side surface of the metal enclosure (such as, e.g., opening 122 shown in FIG. 2) and a non-conductive outer cover coupled to the main body 101 for covering this opening (such as, e.g., outer cover 120 shown in FIG. 2). In embodiments, this covered opening forms a non-conductive surface on the otherwise conductive main body 101 and can be configured to provide access to, and/or enable operation of, one or more electronic components within the microphone 100. For example, in the illustrated embodiment, the display bezel area 106 can be positioned within, and/or accessible through, the non-conductive, covered opening of the main body 101. In other embodiments, the non-conductive opening of the main body 101 can provide access to additional, or alternative, electronic devices, such as, for example, a user interface (not shown) comprising one or more input devices for controlling operation of the microphone 100. In some embodiments, the non-conductive opening can be included in the main body 101 specifically for enabling, and/or creating a space for, operation of one or more antennas of the wireless microphone 100. Also, in various embodiments, the non-conductive opening can be positioned in the same or different locations of the main body 101 as compared to that shown in FIGS. 1 and 2 and described herein. Thus, while the embodiments described herein are directed to placement of an antenna within the display bezel opening of the main body 101, it should be appreciated that the same techniques can be used for placement of an antenna within any type of non-conductive opening within the main body 101.

FIG. 2 depicts a close-up front view of the display bezel area 106 and various electronic components included therein, such as the display screen 104 and the secondary antenna 110, in accordance with embodiments. The display screen 104 (also referred to herein as "LCD display") can be configured to present a user interface for interacting with the wireless microphone 100 and/or displaying one or more settings associated with operation of the microphone 100. In some cases, the wireless microphone 100 includes one or more input devices (not shown) (e.g., control buttons and/or switches, touch screen, etc.) disposed on the main body 101 and/or in the display bezel area 106 to enable user control of the microphone settings.

Figure 3:
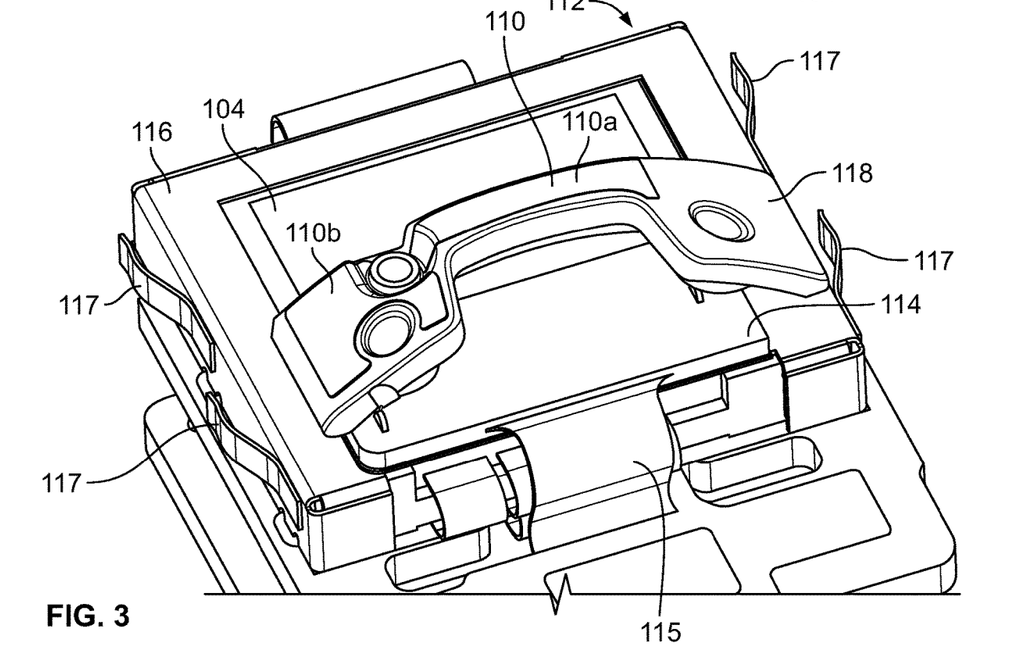
FIG. 3 is a top perspective view of an example electronics housing comprising an example antenna and located within the display bezel area of FIG. 2, in accordance with certain embodiments.

Referring additionally to FIG. 3, shown is a top perspective view of an example electronics assembly 112 included in the display bezel area 106 of the wireless microphone 100, in accordance with embodiments. As shown, the electronics assembly 112 supports the LCD display 104 as well as other electronic components of the wireless microphone 100. For example, the electronics assembly 112 may include an infrared device 113 for implementing short-range operations of the wireless microphone 100. The electronics assembly 112 can further include a printed circuit board (PCB) 114 comprising circuitry components for enable operation of the secondary antenna 110, the LCD display 104, and/or the infrared device 113. In embodiments, a feed point of the secondary antenna 110 can be coupled to the PCB 114 included in the electronics assembly 112. The electronics assembly 112 may also include a flex PCB 115 coupled to the PCB 114 to convey an RF feed or other wireless signal to the feed point of the secondary antenna 110 for wireless transmission. In some embodiments, one or more circuitry components can be coupled between the secondary antenna 110 and the PCB 114 to provide appropriate impedance matching for the antenna 110, as described in more detail with respect to FIGS. 5-7.

As also shown in FIG. 3, the electronics assembly 112 further includes a bracket 116 that surrounds and supports the LCD display 104 and can be made of metal or other conductive material. In embodiments, the electronic assembly 112 can also include a plurality of grounding tabs 117 that are configured to contact an interior of the main body 101 to ground the bracket 116 to the metal housing of the main body 101. In such cases, the metal housing of the main body 101 can serve as a grounding plane for the secondary antenna 110 and/or the primary antenna assembly 108, and can isolate the antennas from conducted and/or radiated RF interference from audio and power source circuitry included in the wireless microphone 100.

Figure 4:
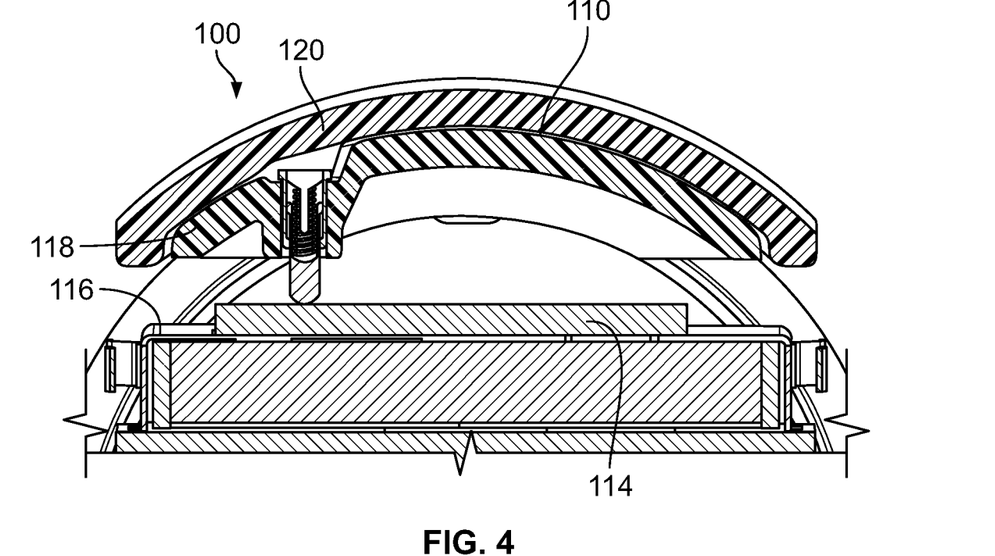
FIG. 4 is a cross-sectional view of the electronics housing shown in FIG. 3, in accordance with certain embodiments.

Referring additionally to FIG. 4, shown is a cross-sectional view of the display bezel area 106 to illustrate an example configuration for completely integrating the secondary antenna 110 into the display bezel area 106 of the wireless microphone 100, in accordance with embodiments. In the illustrated embodiment of FIGS. 3 and 4, the secondary antenna 110 is disposed on an antenna support 118 that is configured to position the antenna 110 against an underside of a non-conductive outer cover 120 for the display bezel area 106. For example, the antenna support 118 (also referred to herein as a "support structure") can be configured to elevate the antenna 110 above the display bezel area 106 and structurally support the antenna 110 against the outer cover 120. As shown in FIG. 4, the secondary antenna 110 is positioned, or sandwiched, between the outer cover 120 and the antenna support 118, so that the antenna 110 is adjacent to both two surfaces. In some embodiments, the antenna 110, the outer cover 120, and the antenna support 118 are joined together to form a cohesive unit into which the antenna 110 is embedded. In some embodiments, the antenna support 118 also serves as a non-conductive barrier between the antenna 110 and the electronic assembly 112 included in the display bezel area 106 to further minimize RF interference therebetween.

As shown in FIG. 2, the outer cover 120 can be configured to span across and cover a main body opening 122 in which the display bezel area 106 is positioned. The opening 122 (also referred to herein as a "non-conductive opening") can be a gap in a side surface of the conductive main body 101 and can be configured to provide access to, and/or enable operation of, the electronics assembly 112 included in the display bezel area 106, including, for example, the LCD display 104. In some embodiments, the outer cover 120 can be made of a transparent or semi-transparent material, so that at least the LCD display 104 within the display bezel area 106 is visible and accessible on the surface of the wireless microphone 100, as shown in FIG. 2. As shown in FIGS. 2 and 4, the outer cover 120 can be coupled to the main body 101, for example, along a perimeter of the opening 122 and can be curved to match a curvature of an outer surface (i.e., the conductive enclosure) of the main body 101, so that the outer cover 120 sits flush with, and/or forms a portion of, the outer surface of the main body 101. In this manner, the outer cover 120 can be fully integrated with the outer surface of the main body 101.

In embodiments, a shape of the secondary antenna 110 can be curved to match or conform to the curvature of the outer cover 120, so that the antenna 110 is as close as possible to the outer surface of the wireless microphone 100 for optimizing antenna performance. The curved shape of the antenna 110 can also be configured to elevate the antenna 110 above the components of the electronic assembly 112, such as, for example, the PCB 114, to help minimize RF interference therewith. In the illustrated embodiment, the antenna support 118 also has a curved shape that matches or conforms to the shape of the outer cover 120 and/or the antenna 110, to help position the antenna 110 flush against the outer cover 120. In other embodiments, the secondary antenna 110 can be attached directly to the outer cover 120. For example, the antenna 110 can be formed onto the underside of the outer cover 120 using LDS or metal plating techniques (not shown). In such cases, the antenna 110 may be integrated into the display bezel area 106 and placed adjacent to the outer cover 120 without using the antenna support 118.

In embodiments, the secondary antenna 110 can have a physically shorter length due to the configuration of the display bezel area 106. For example, the overall size and shape of the secondary antenna 110 can be limited, at least in part, by the space available within the display bezel area 106. In particular, the antenna 110 must be small enough to fit within an opening 122 for placement of the display bezel area 106 into the main body 101. The shape and size of the antenna 110 can also be configured to avoid contact with, or maintain sufficient distance from, the metal housing of the main body 101 and the conductive or electronic components in the display bezel area 106, as described in more detail below. To compensate for the shorter antenna length, the outer cover 120 and/or the antenna support 118 can be made from dielectric materials configured to provide additional electrical properties for extending an electrical length of the secondary antenna 110. In some embodiments, the outer cover 120 and/or the antenna support 118 can be made from dielectrically-loaded plastics that are specifically configured to enable wireless operation of the secondary antenna 110 within a desired frequency band (e.g., 1.5 GHz, 1.8 GHz, 2.4 GHz, 5.7 GHz, 6.9 GHz, 7.1 GHz, etc.).

The exact size and shape of the secondary antenna 110 can also be configured to avoid contact and/or RF interference with the LCD display 104 and other electronic components included in the display bezel area 106, such as, for example, the infrared device 113 and the printed circuit board 114, as well as other nearby conductive components, such as, for example, the conductive housing of the main body 101 and the metal bracket 116. For example, the antenna support 118 can be configured to elevate the antenna 110 by a distance that is sufficient to avoid RF interference with the conductive and/or electronic components located there under. As another example, the secondary antenna 110 can be positioned between the LCD display 104 and the infrared device 113 and can be shaped to avoid overlap with, and maintain an electrically-significant distance from, either device. In the illustrated embodiment of FIG. 2, for example, the secondary antenna 110 includes an elongated portion 110*a* with a width and length configured to fit within the rectangular space available between the LCD display 104 and the infrared device 113. In addition, the secondary antenna 110 further includes a second portion 110*b* with a length and width configured to fit within the square-like space available next to the infrared device 113.

The exact shape and configuration of the secondary antenna 110 can also depend on the desired operating bands for the antenna 110 and the type of antenna being incorporated therein. According to embodiments, the secondary antenna 110 can be any suitable type of antenna, including, for example, a monopole antenna, a dipole antenna, an inverted-F antenna, a planar inverted-F antenna (PIFA), inverted L-antenna, dual inverted L-antenna, or hybrids of these antenna structures. Also in embodiments, the secondary antenna 110 can be configured to support any frequency band suitable for implementation of the antenna diversity feature of the wireless microphone 100. For example, the secondary antenna 110 can be configured to operate within a frequency band that corresponds to one of the frequency bands supported by the primary antenna assembly 108. In a preferred embodiment, both the primary antenna assembly 108 and the secondary antenna 110 are configured for wireless operation in the Zigbee or 2.4 GHz band. In other embodiments, both antennas can be configured for wireless operation in the 1.5 GHz, 1.8 GHz (which includes the 1.9 GHz or "DECT" band), 5.7 GHz, 6.9 GHz, or 7.1 GHz bands. As will be understood by one of ordinary skill in the art, each of these frequency bands covers or includes a range of frequencies surrounding the named frequency.

In some embodiments, the secondary antenna 110 can be further configured for dual-band operation in two or more high frequency bands, such as, for example, the UHF band, the 1.5 GHz, the 1.8 GHz band, the 2.4 GHz band, the 5.7 GHz band, the 6.9 GHz band, and/or the 7.1 GHz band. In such cases, the shape and/or type of the secondary antenna 110 can be modified to enable operation in the second frequency band. For example, the secondary antenna 110 may include an additional antenna structure (not shown) in addition to the antenna structure shown in FIG. 3. In some embodiments, such dual-band operation can be used for simultaneous transmission of audio and control data signals by the wireless microphone 100 to a remote receiver or transceiver.

According to embodiments, the primary antenna assembly 108 can include a primary antenna (not shown) configured for enabling wireless operation of the microphone 100 in conjunction with the secondary antenna 110. In some embodiments, the primary antenna is capable of, or configured for, simultaneously transmitting audio data and control data to the remote receiver or transceiver, while the secondary antenna 110 is configured to transmit control data (e.g., control link signals) to the remote transceiver during diversity operation. In a preferred embodiment, the primary antenna is a dual-band antenna configured to operate in a first frequency band selected from currently licensed bands—such as, e.g., UHF bands (e.g., 470-950 MHz) and/or any of the VHF bands (e.g., 170-300 MHz)—for transmission of audio data, as well as in a second frequency band selected from currently unlicensed spectrum—such as, e.g., the 1.5 GHz band, the 1.8 GHz band, the 2.4 GHz band, the 5.7 GHz band, the 6.9 GHz band, the 7.1 GHz band, etc.—for transmission of control data. And the secondary antenna 110 is also configured to operate in the same second frequency band as the primary antenna for transmission of control data.

As an example, in embodiments, the primary antenna included in the primary antenna assembly 108 can be the dual-band antenna disclosed by U.S. patent application Ser. No. 14/947,933, the content of which is incorporated by reference herein in its entirety. U.S. patent application Ser. No. 14/947,933 discloses a wireless handheld microphone having an antenna assembly coupled to a bottom end of the microphone, wherein the antenna assembly includes a dual-band helical antenna wrapped around a core unit and covered by an outer shell that interfaces with the bottom end of the microphone, and wherein one embodiment of the helical antenna includes a first antenna structure configured for operation in a lower UHF band (e.g., 470-636 MHz) and a second antenna structure configured for operation in the Zigbee 2.4 GHz band.

In embodiments, the exact locations for placement of the antenna assembly 108 and the antenna 110 on the microphone 100 can be selected based on antenna placement feasibility, or the feasibility of antenna operation in a given location. For example, in the illustrated embodiment, the outer housing or enclosure of the main body 101 of the microphone 100 is made of metal or other conductive material and therefore, antenna placement may not be feasible within the main body 101. On the other hand, the outer housings for the display bezel area 106 (e.g., the outer cover 120) and the primary antenna assembly 108 are made from plastic or other non-conductive material and therefore, antenna placement may be feasible in both of these locations. In other embodiments, the microphone 100 may include additional or alternative non-conductive openings in the main body 101 that similarly allow for antenna placement, such as, for example, an opening for receiving a user interface bezel or an opening specifically configured for antenna placement along the main body 101.

In addition to concerns for the feasibility of antenna operation, the locations of the secondary antenna 110 and the primary antenna assembly 108 can be selected to maximize a physical separation between the respective antennas, thereby enabling spatial diversity operation of the antennas and minimizing mutual coupling between the antennas. For example, as shown in FIG. 1, the primary antenna assembly 108 is coupled to the bottom end 103 of the main body 101, while the secondary antenna 110 is included in the display bezel area 106, which is positioned near the top end 102 of the main body 101. As a result, the two antennas are separated from each other by a main length of the main body 101, or the distance L that spans across a substantial portion of the main body 101, as shown in FIG. 1. In embodiments, the distance L may be sufficient to enable the primary antenna assembly 108 and the secondary antenna 110 to operate as spatial diversity antennas for the wireless microphone 100. As will be appreciated, to provide spatial diversity operation at a given frequency, the antennas should be separated from each other by a distance that is significantly greater than a quarter-wavelength of that frequency. For example, in the case of 1.5 GHz operation, the wavelength is approximately 7.9 inches and therefore, the two antennas must be spaced apart by at least 2 inches in order to maximize diversity operation at this frequency. Accordingly, the distance L can be selected to ensure optimal diversity operation for the antennas 108 and 110.

In addition to enabling spatial diversity, the physical separation between the secondary antenna 110 and the primary antenna assembly 108 can help minimize the probability of radio frequency (RF) link loss due to, for example, human body detuning or other antenna obstruction. As will be appreciated, antenna detuning can occur when an antenna element is placed in close proximity to metal or other conductive parts and/or placed on or near a human body. For example, placement of a user's hand over the display bezel area 106 or the bottom end 103 may cause the corresponding antenna to loss RF connection. In embodiments, the spatial separation between the antenna assembly 108 and the secondary antenna 110 can help mitigate the effects of antenna obstruction by lowering the probability that both antennas will experience RF link loss at the same time. For example, a human hand placed over the bottom end 103 may adversely affect RF operation of the primary antenna assembly 108 but not the secondary antenna 110. In such cases, antenna operation may switch from the primary antenna assembly 108 to the secondary antenna 110 to provide better signal quality. Likewise, if the signal quality obtained by the secondary antenna 110 becomes degraded due to a nearby obstruction, antenna operation may switch from the antenna 110 to the primary antenna assembly 108.

In embodiments, the wireless microphone 100 can further include a processor and/or other hardware (not shown) configured to implement antenna switching and/or selecting processes for enabling diversity operation of the antennas 108 and 110. In addition, the wireless microphone 100 may include a transmitter, receiver, and/or transceiver (not shown) coupled to the processor, the primary antenna assembly 108, and the secondary antenna 110 for supporting various wireless applications, including transmission and/or reception of radio frequency (RF) signals between the wireless microphone 100 and other devices within the microphone system (not shown), such as, for example, a remote receiver or transceiver.

According to embodiments, when operating in an antenna selection mode, the processor can be configured to monitor the signal quality of an RF link with a first antenna (e.g., the primary antenna assembly 108) by, for example, comparing the signal quality against a predetermined threshold. If the processor detects that the signal quality has dropped below the predetermined threshold, for example, due to obstruction of the first antenna, the processor can be configured to switch operation to a second antenna (e.g., the secondary antenna 110), for example, by establishing an RF link with the second antenna. In such cases, the second antenna can be configured to transmit audio data and/or control data to provide wireless coverage for the first antenna. In a preferred embodiment, the second antenna is configured to transmit control data over a given frequency band when the first antenna is obstructed or otherwise incapable of transmitting control data over that band (e.g., the Zigbee or 2.4 GHz band).

In some embodiments, the processor can be configured to operate in a switching diversity mode upon determining that the transceiver of the wireless microphone 100 is operating in a diversity mode. In such cases, due to the spatial diversity created through placement of the antennas 108 and 110 on opposite ends of the main body 101, the processor can switch between the primary antenna 108 and the secondary antenna 110 to provide wireless operation within a given frequency band. In a preferred embodiment, both the secondary antenna 110 and the primary antenna 108 can be configured to transmit control data over the given frequency band (e.g., the Zigbee or 2.4 GHz band).

Figure 5:
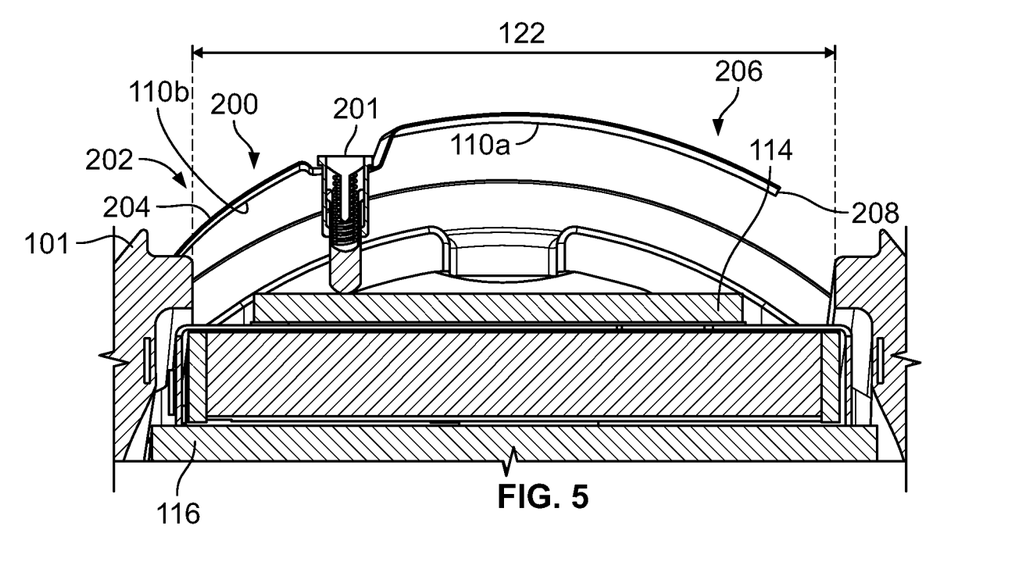
FIG. 5 is a cross-sectional view of a first example antenna feed structure for the antenna shown in FIG. 3, in accordance with certain embodiments.

FIG. 5 illustrates an example antenna feed structure 200 for providing impedance matching for the secondary antenna 110, in accordance with embodiments. As shown in FIG. 5, the antenna feed structure 200 includes a connection pin 201 configured to electrically couple the secondary antenna 110 to the printed circuit board 114 and provide an RF feed point for the antenna 110. The connection pin 201 can be a pogo pin or any other suitable RF connector. In embodiments, the antenna feed structure 200 can be configured to use the location of the connection pin 201 to obtain transmission line matching. For example, in the illustrated embodiment, the antenna feed structure 200 includes a first extension 202 configured to directly connect the antenna 110 to the ground plane of the microphone 100 by extending a length of the second portion 110b of the secondary antenna 110 until a first end 204 of the antenna 110 contacts the metal housing of the main body 101. The antenna feed structure 200 can also include a second extension 206 for extending a length of the elongated portion 110a of the secondary antenna 110, so that a second end 208 of the antenna 110 extends further across the opening 122 of the display bezel area 106, but still remains open or unattached. In such embodiments, the antenna 110 can be configured as a curved planar inverted-F antenna (PIFA) type, and the location of the connection pin 201 relative to the fixed end 204 and the open end 208, as well as the direct ground connection formed by the first extension 202, can provide appropriate impedance matching for the RF feed point of the antenna 110.

Figure 6:
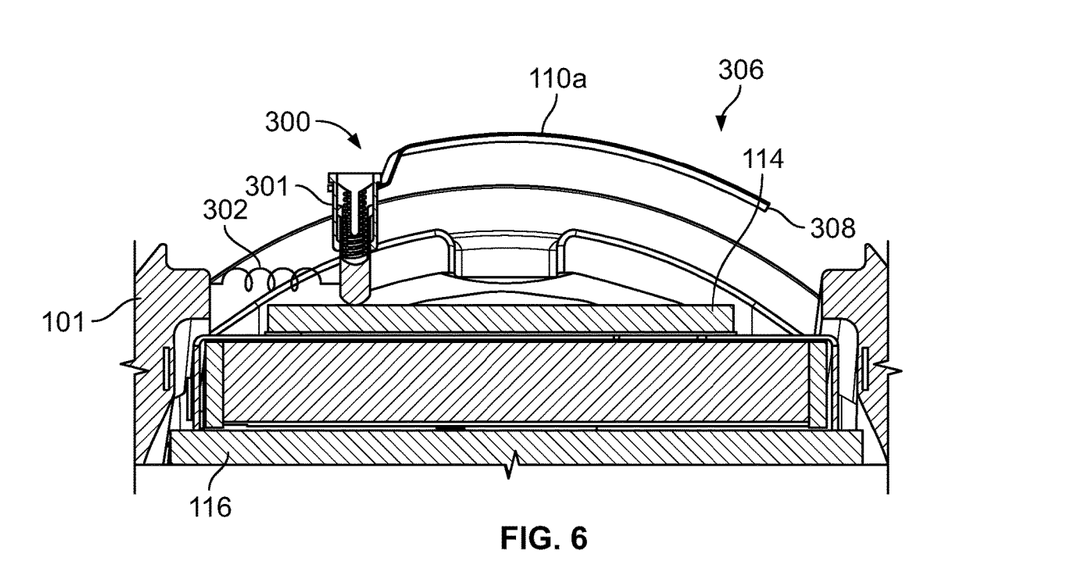
FIG. 6 is a cross-sectional view of a second example antenna feed structure for the antenna element shown in FIG. 3, in accordance with certain embodiments.

FIG. 6 illustrates another example antenna feed configuration 300 for providing impedance matching for the secondary antenna 110, in accordance with embodiments. As shown in FIG. 6, the antenna feed structure 300 includes a connection pin 301 similar to the connection pin 201 described above. However, in the antenna feed structure 300, the second portion 110b for grounding the antenna 110 is removed. Instead, the connection pin 301 is directly coupled to the ground plane, or the main body 101, by an inductor 302, such as, for example, a high quality (Q) inductor or other RF coil. In such embodiments, the secondary antenna 110 can be configured as a modified curved PIFA type, and the inductor 302 can be configured to provide appropriate impedance matching for the RF feed point of the antenna 110. For example, in some embodiments, the inductor 302 can include two inductors (not shown) connected in parallel in order to provide the appropriate inductance value required for impedance matching and to minimize signal losses. As shown in FIG. 6, the antenna feed structure 300 can also include an extension 306 for extending a length of the elongated portion 110a of the secondary antenna 110, so that a second end 308 of the antenna 110 extends further across the opening 122 while still remaining open or unattached. In some cases, the length of the extension 306 can be configured to compensate for removal of the second portion 110b from the antenna 110.

Figure 7:
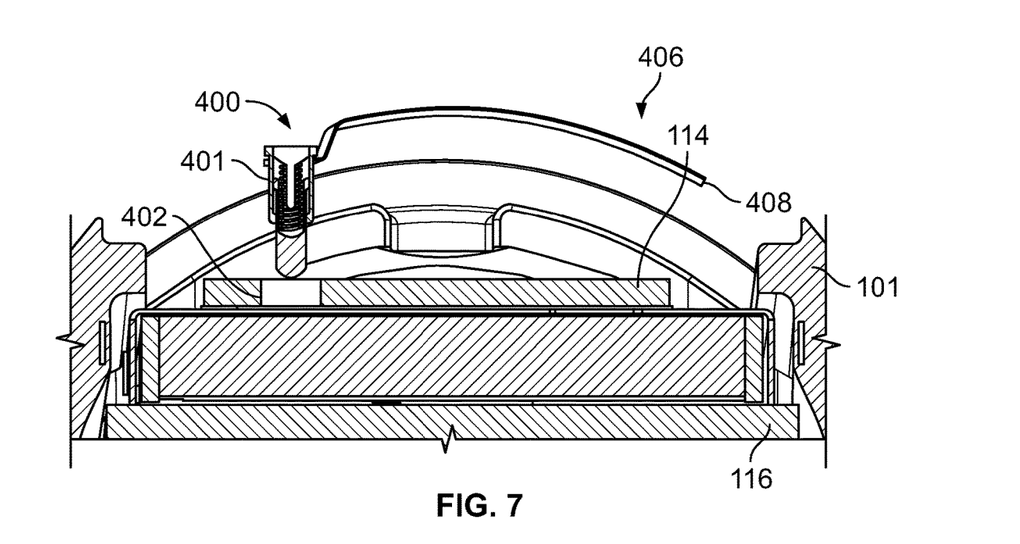
FIG. 7 is a cross-sectional view of a third example antenna feed structure for the antenna element shown in FIG. 3, in accordance with certain embodiments.

FIG. 7 illustrates another example antenna feed configuration 400 for providing impedance matching for the secondary antenna 110, in accordance with embodiments. As shown in FIG. 7, the antenna feed structure 400 includes a connection pin 401 similar to the connection pin 201 described above. Like the antenna feed configuration 300, the antenna feed configuration 400 does not include the second portion 110b of the secondary antenna 110. As illustrated, the antenna feed structure 400 includes an impedance matching network 402 coupled between the connection 401 and the PCB 114. In embodiments, the matching network 402 can be a lumped component (LC) matching network comprising a plurality of inductors and capacitors that are configured to receive the RF signal before the signal is fed into the antenna 110. In such embodiments, the secondary antenna 110 can be configured as a curved monopole antenna type, and the feed point to the connection pin 401 can serve as the starting point of the radiating portion of the antenna 110.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An antenna for a wireless device comprising at least one printed circuit board (PCB), the antenna comprising:
   a modified planar inverted-F antenna (PIFA) structure including:
      a radiating portion comprising a conductive element coupled to a connection element, and
      an impedance matching portion comprising at least one inductor coupled to the connection element;
   an antenna feed point formed by electrically coupling the connection element to the PCB; and
   a dielectric structure configured to support the radiating portion, the dielectric structure comprising a dielectrically-loaded material configured to extend an electrical length of the conductive element.

2. The antenna of claim 1, wherein the at least one inductor is configured for connection to a ground plane of the wireless device.

3. The antenna of claim 2, wherein the at least one inductor includes two high quality (Q) inductors connected in parallel between the antenna feed point and the ground plane.

4. The antenna of claim 1, wherein the connection element includes a pogo pin.

5. The antenna of claim 1, wherein the conductive element is formed on a surface of the dielectric structure using laser direct structuring (LDS), such that the dielectric structure and the radiating portion form a single unit.

6. The antenna of claim 1, wherein the conductive element has an elongated curved shape.

7. The antenna of claim 6, wherein the elongated curved shape has a free end and an opposing fixed end coupled to the connection element.

8. The antenna of claim 1, wherein a length of the conductive element is selected to enable antenna operation in at least one of the following frequency bands: 1.5 Gigahertz (GHz), 1.8 GHz, 2.4 GHz, 5.7 GHz, 6.9 GHz, and 7.1 GHz.

9. A modified planar inverted-F antenna (PIFA), comprising:
   an elongated antenna portion formed by a conductive element extending from a connection element;
   at least one inductor configured to couple the connection element to a ground plane of the antenna; and
   a dielectric structure configured to support the elongated antenna portion, the dielectric structure comprising a dielectrically-loaded material configured to extend an electrical length of the conductive element.

10. The modified PIFA of claim 9, wherein the at least one inductor obviates a need for a typical shortened PIFA leg.

11. The modified PIFA of claim 9, wherein the modified PIFA differs from a typical PIFA by omitting a shortened antenna portion for grounding the antenna.

12. The modified PIFA of claim 11, wherein the modified PIFA further differs from the typical PIFA by including the at least one inductor to ground the antenna.

13. The modified PIFA of claim 9, wherein the at least one inductor includes two high quality (Q) inductors connected in parallel between the connection element and the ground plane.

14. The modified PIFA of claim 9, wherein the connection element electrically couples the conductive element to an antenna feed point.

15. The modified PIFA of claim 9, wherein the connection element includes a pogo pin.

16. The modified PIFA of claim 9, wherein the conductive element has an elongated curved shape with a fixed end coupled to the connection element and an opposing free end.

17. The modified PIFA of claim 9, wherein a length of the conductive element is selected to enable antenna operation in at least one of the following frequency bands: 1.5 Gigahertz (GHz), 1.8 GHz, 2.4 GHz, 5.7 GHz, 6.9 GHz, and 7.1 GHz.

18. The modified PIFA of claim 9, wherein the dielectrically-loaded material is configured to enable antenna operation in at least one of the following frequency bands: 1.5 Gigahertz (GHz), 1.8 GHz, 2.4 GHz, 5.7 GHz, 6.9 GHz, and 7.1 GHz.

19. The modified PIFA of claim 9, wherein the dielectric structure includes a support disposed below the elongated antenna portion, and a cover disposed above the elongated antenna portion.

20. The modified PIFA of claim 9, wherein the elongated antenna portion is embedded within the dielectric structure, such that the dielectric structure and the elongated antenna portion form a single unit.

21. The modified PIFA of claim 9, wherein the conductive element is formed on a surface of the dielectric structure using laser direct structuring (LDS), such that the dielectric structure and the elongated antenna portion form a single unit.

22. The antenna of claim 1, wherein the dielectrically-loaded material is configured to enable antenna operation in at least one of the following frequency bands: 1.5 Gigahertz (GHz), 1.8 GHz, 2.4 GHz, 5.7 GHz, 6.9 GHz, and 7.1 GHz.

23. The antenna of claim 1, wherein the dielectric structure includes a support disposed below the radiating portion, and a cover disposed above the radiating portion.

24. The antenna of claim 1, wherein the radiating portion is embedded within the dielectric structure, such that the dielectric structure and the radiating portion form a single unit.

25. The antenna of claim 1, wherein the at least one inductor obviates a need for a typical shortened PIFA leg.

26. The antenna of claim 1, wherein the modified PIFA differs from a typical PIFA by omitting a shortened antenna portion for grounding the antenna.

27. The antenna of claim 26, wherein the modified PIFA further differs from the typical PIFA by including the at least one inductor to ground the antenna.

* * * * *